(12) United States Patent
Drewes

(10) Patent No.: US 9,360,062 B2
(45) Date of Patent: Jun. 7, 2016

(54) BRAKE SYSTEM FOR UTILITY VEHICLES

(71) Applicant: SAF-HOLLAND, GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 32 days.

(21) Appl. No.: 14/360,814

(22) PCT Filed: Dec. 13, 2012

(86) PCT No.: PCT/EP2012/075315
§ 371 (c)(1),
(2) Date: May 27, 2014

(87) PCT Pub. No.: WO2013/087741
PCT Pub. Date: Jun. 20, 2013

(65) Prior Publication Data
US 2014/0291093 A1    Oct. 2, 2014

(30) Foreign Application Priority Data

Dec. 16, 2011   (DE) .......................... 10 2011 088 848

(51) Int. Cl.
| F16D 51/00 | (2006.01) |
| F16D 65/28 | (2006.01) |
| F16D 51/20 | (2006.01) |
| F16D 65/09 | (2006.01) |
| F16D 125/66 | (2012.01) |

(52) U.S. Cl.
CPC ................ *F16D 51/00* (2013.01); *F16D 51/20* (2013.01); *F16D 65/09* (2013.01); *F16D 65/28* (2013.01); *F16D 2125/66* (2013.01)

(58) Field of Classification Search
CPC ......... F16D 51/14; F16D 51/20; F16D 65/22; F16D 65/14; F16D 2121/02; B60T 17/22; B60T 17/083
USPC .................................................. 188/152, 343
See application file for complete search history.

(56) References Cited

U.S. PATENT DOCUMENTS

| 2,501,578 | A | * | 3/1950 | Pointer | ................... F16D 51/14 188/335 |
| 3,269,492 | A | * | 8/1966 | Cox | ....................... F16D 65/22 188/152 |
| 4,350,230 | A | | 9/1982 | Ingram et al. | |
| 4,519,482 | A | * | 5/1985 | Ott | ......................... F16D 65/22 188/343 |

(Continued)

FOREIGN PATENT DOCUMENTS

| CN | 2883782 | 3/2007 |
| CN | 2908908 | 6/2007 |
| DE | 1029626 | 5/1958 |

OTHER PUBLICATIONS

International Search Report; European Patent Office, Apr. 5, 2013.

*Primary Examiner* — Christopher Schwartz
(74) *Attorney, Agent, or Firm* — Price Heneveld LLP

(57) ABSTRACT

The present invention relates to a brake system for utility vehicles, comprising an actuation unit, a transmission element and a converter unit, wherein the actuation unit moves the transmission element along a transmission axis, the converter unit being arranged on a wheel axis and comprising at least one piston element. According to the invention, the transmission axis intersects the wheel axis at least in the region of the converter unit, and the transmission element is designed to transmit a force onto the piston element in order to move the latter transverse to the wheel axis.

28 Claims, 2 Drawing Sheets

(56) References Cited

U.S. PATENT DOCUMENTS

| | | | | |
|---|---|---|---|---|
| 4,621,713 A | * | 11/1986 | Carre | B60T 17/083 188/343 |
| 4,800,991 A | * | 1/1989 | Miller | B60T 17/22 116/208 |
| 6,415,896 B1 | * | 7/2002 | Arai | F16D 51/20 188/106 F |

* cited by examiner

BRAKE SYSTEM FOR UTILITY VEHICLES

BACKGROUND OF THE INVENTION

The present invention relates to a brake system for utility vehicles or commercial vehicles, comprising an actuation unit, a converter unit, and a transmission unit.

Brake systems of the type in question are well known in the prior art. One or more brake shoe elements are pivotable and secured against rotation and connected to the vehicle frame and may be pushed against the inside of a rotating brake drum by means of a spreader element. However, the force is not uniformly transmitted over the entire circumferential surface of the brake shoe elements by friction of the brake shoe elements against the brake drum, which results both in a reduced braking effect and uneven wear on the brake shoe elements. This leads not only to uneven wear along the circumference of a brake shoe, but also to different wear on the brake shoe pivoting in the direction of rotation of the drum element and the brake shoe pivoting against the direction of rotation of the brake drum, respectively, causing increased costs due to the fact that the brake lining provided on the brake shoe elements is not entirely used.

The object underlying the present invention is to provide a brake system, which, on the one hand, may generate a great braking effect or high braking forces and, on the other hand, allows for uniform wear on the brake linings attached to the brake shoe elements.

SUMMARY OF THE INVENTION

According to the invention, the brake system, which is in particular construed as a brake system of a wedge drum brake or as a wedge drum brake system, comprises an actuation unit, a transmission element and a converter unit, wherein the actuation unit moves or displaces the transmission element along a transmission axis, wherein the converter unit is arranged on a wheel axis and comprises at least one piston element, wherein the transmission axis intersects the wheel axis at least in the region of the converter unit, and wherein the transmission element is adapted or designed to transmit a force onto the piston element in order to displace the latter transverse to the wheel axis. The actuation unit is preferably a pneumatically or hydraulically actuated brake cylinder, which is adapted to cause a translatory movement of the transmission element. Expediently, the actuation unit comprises an actuation pin to this end, which converts or transforms a force along a transmission axis in a translatory movement and vice versa. The transmission element preferably is a longish body extending essentially along the transmission axis and serves for transmitting a force applied by the actuation unit to the converter unit. Particularly preferably, the converter unit is a wedge unit of a wedge drum brake. Preferably, the transmission element is formed like a rod, wherein particularly preferably it has a circular cross-section. According to the invention, the converter unit is arranged on a wheel axis, wherein the wheel axis particularly preferably is the axis of rotation of the rotating wheel of the utility vehicle. Particularly preferably, the wheel axis is characterized in that it is at the same time the axis, about which an axle stub element is formed in a rotation-symmetric manner. In the region of the converter unit, the wheel axis intersects the transmission axis, wherein, according to the invention, in this region the transmission element projects into the converter unit and transmits the force applied by the actuation unit to the converter unit. This is in particular advantageous when designing the brake as wedge drum brake. Here, the converter unit particularly preferably serves for converting the movement of the transmission element along the transmission axis into a movement of a piston element transverse to the wheel axis. Preferably, there may also be provided two piston elements, which move along respective paths directed collinearly relative to one another transverse to the wheel axis, wherein the converter unit converts the translatory movement of the transmission element into two opposite translatory movements of the piston elements.

Preferably, there is provided a shoe element or brake shoe element, which is displaceable transverse to the wheel axis, wherein the shoe element at the side thereof opposite the wheel axis preferably has a brake lining. Preferably, the shoe element is similar to a brake shoe of a wedge drum brake known from the prior art, wherein at the outwards facing surface of the shoe element there is provided a brake lining. The shoe element, at the side opposite the wheel axis, preferably has a curvature, wherein the mean radius of said curvature preferably is identical to the inner radius of a brake drum rotating about the brake system. In this way, it is ensured that, when the shoe element moves towards the inner side of the brake drum, the entire surface of the brake lining attached on the outwards facing side of the shoe element comes into contact with the brake drum, resulting in a friction pairing. Particularly preferably, there are provided two shoe elements, which are arranged on respective opposite sides of the wheel axis. Advantageously, the shoe element is preferably not pivoted or swiveled, but only performs a translatory movement along a direction running transverse to the wheel axis. Thus, it may be ensured that the shoe element with its surface facing the inner side of the brake drum or with the brake lining can come entirely into contact with the inner surface of the brake drum, wherein maximum braking forces or friction forces may be generated and a maximum braking effect may be achieved.

Further preferably, the piston element is adapted to exert a force onto the shoe element in order to displace the shoe element transverse to the wheel axis and to bring it into a position, in which the brake element brakes. One of the essential main functions of the piston element is to exert a force onto the shoe element and to displace the latter transverse to the wheel axis such that the distance to the wheel axis increases. Here, the piston element serves at the same time as a direction converter of the force, which is transmitted by the transmission element to the piston element and is further passed on to the shoe element via the piston element. In the particularly preferred embodiment with two piston elements, which move away from the wheel axis along collinear paths or directions on a respective side of the wheel axis, preferably two shoe elements may be pushed at respective opposite sides of the wheel axis against the inner surface of a brake drum. Particularly preferably, the piston element comprises an adjustment device, which makes it possible to adjust the position of the shoe element relative to the wheel axis depending on the wear of the brake lining on the shoe element, i.e. depending on the thickness of the brake lining on the shoe element. It may be further preferred that the piston element exerts a force on the shoe element in one direction only, wherein there is provided a resetting element in order to return the piston element and the shoe element to a resting position, i.e. a position, in which the shoe element is not in contact with the brake drum.

Advantageously, there is provided a resetting element, by means of which the shoe element is held against the piston element and/or an opposite shoe element. To put it differently, it is particularly preferred that a resetting element holds the shoe element pushed against the piston element. Particularly preferably, there may be provided two opposite shoe elements, wherein the resetting element engages both shoe elements, displaces them towards each other, and hereby also displaces them also towards the converter unit or two respective opposite piston elements. Here, the resetting element may be designed both as a leaf spring and as a spiral spring, wherein the spring force must be sufficient to make it possible to duly reset the shoe elements and, thus, to duly release the brake or the wedge drum brake, even in the case of dirt in the drum brake due to rubbed-off or abraded brake lining, for example.

In a particularly preferred embodiment, there is provided a guiding unit in order to hold the shoe element on a path lying transverse to the wheel axis. The shoe element is displaced essentially between two positions: a first position, in which the shoe element is not in contact with the brake drum and the distance between the shoe element and the wheel axis is minimal, and a second position, in which the shoe element is pushed against the brake drum element, friction between the shoe element and the brake drum occurs and the distance between the shoe element and the wheel axis is maximal. In order to guide the shoe element between said two positions, it is preferred to provide a guiding unit, which advantageously only allows the shoe element to displace between the first position and the second position. Particularly preferably, the guiding unit secures the shoe element against displacement in the circumferential direction, i.e. in the direction of a rotation about the wheel axis. This is necessary since braking forces acting on the shoe element essentially act in the circumferential direction and accordingly have to be absorbed by the guiding unit supporting the shoe element. The path, along which the shoe element displaces, is preferably linear. Alternatively, it is also possible to provide a slightly curved path in the region of the second position, for example, in order to increase the braking force between the shoe element and the brake drum, for example, by pushing the shoe element more heavily against the brake drum, making use of the circumferential components of the braking force. However, it has to be taken care that the path is not too much curved, since otherwise the shoe element may get jammed in the second position and it is no longer possible to release it from the brake drum.

Preferably, the guiding unit comprises two parallel guiding legs, between the facing surfaces of which the shoe element is guided. Here, it is preferred that the guiding legs are adapted such that they particularly well absorb forces in the circumferential direction and may pass them on to the non-rotating chassis system of the utility vehicle. It may be particularly preferred to design the guiding legs as T beam, wherein the upper surface of the T is at the same time the guiding surface for the brake shoe element. Further preferred cross-sectional configurations, which are characterized by a high area moment of inertia, may be designed U, L or double T shaped. At the same time, it may be preferred that the guiding leg being in front in the direction of rotation of the brake drum is dimensioned more solidly, i.e. e.g. having a greater bending stiffness than the backwards facing guiding leg. Since, in general, higher braking forces have to be expected when the utility vehicle moves forwards than in case it moves backwards, it is expedient to adapt the guiding leg lying in front to absorb higher forces than the rear guiding leg. Thus, by saving material at the rear guiding leg, weight may preferably be saved. It may be preferred in particular that the guiding legs have longitudinal grooves, which are engaged by respective projections on the brake shoe element in order to secure the brake shoe element not only against displacement in the circumferential direction, but also against displacement along the wheel axis. In an alternatively preferred embodiment, the guiding unit may have a track instead of the guiding legs, which track engages a respective recess or a respective longitudinal groove on the shoe element and secures the shoe element in both circumferential directions, i.e. both when it rotates forwards and backwards. Here, the track of the guiding unit preferably engages an undercut of the cavity on the shoe element in order to secure the shoe element against displacement along the wheel axis. Preferably, the guiding unit is either indirectly or directly connected to the axle tube of the utility vehicle, wherein the forces and moments present during braking operations are directly transmitted to the axle tube.

Advantageously, when the wheel axis is displaced or pivoted or inclined by an angle $\alpha$ relative to the transmission axis, which angle is preferably in a range of 0° to 85°, more preferably in a range of 0° to 75°, and particularly preferably about 55°. By means of the angular offset of the wheel axis to the transmission axis, it is possible to arrange the converter unit centrally on the wheel axis and at the same time to use an essentially continuous axle tube or a combination of an axle tube and an axle stub. Here, when a verges towards 0, the transmission axis is arranged essentially parallel to the wheel axis, wherein the axle tube is fixed otherwise to the brake system or the axle stub since the actuation unit is provided in the place of the axle tube. The angle $\alpha$ is chosen preferably smaller than 85°, since in a range of more than 85° the wheel of the utility vehicle is already arranged in a rotating manner and, thus, could collide with the brake cylinder. Depending on the geometric conditions on the chassis system of the utility vehicle, it is preferred to provide an angle in a range of 0° to 85°, wherein the particularly preferred angle is about 45°, since thus a particularly compact design of the brake system and, thus, also of the remaining chassis system of the utility vehicle may be achieved.

Particularly preferably, the surfaces of the guiding legs of the guiding unit are directed vertical or perpendicular to the plane spanned by the wheel axis and the transmission axis. In case the wheel axis and the transmission axis are arranged rotated relative to one another by an angle $\alpha$ larger than 0°, both axes span one plane. In order to be able to insert and remove the transmission element particularly evenly into and from the converter unit and in order to allow for a particularly advantageous force transmission from the transmission element to the piston element, it is preferred that the direction of displacement of the piston elements and particularly preferably also the surfaces of the guiding legs of the guiding unit guiding the shoe element are directed perpendicular or vertical to the plane spanned by the axes. With the help of this feature, it is possible to discretionarily change the angle between the wheel axis and the transmission axis without impairing the functioning of the brake system.

It is further preferred that the converter unit has a housing, which forms an integral part of the first axle element, wherein the housing of the converter unit preferably is formed by at least one cavity in the first axle element. In order to achieve a highly compact and integral design of the brake system, it is in particular preferred to integrate the housing of the converter unit into a first axle element. Here, the first axle element may be the axle stub of the axle of a utility vehicle, for example, wherein in this case the converter unit is arranged on an end of the first axle element opposite the bearing portion for the wheel bearing. Due to the fact that cavities have to be provided in the housing of the converter unit, it is preferred to reinforce the remaining portions of the first axle element and/or of the housing, for example with the help of material webs, which re-increase the bending strength of the first axle element and/or of the housing, which bending strength is reduced due the cavities provided. It is in particular preferred that the housing of the converter unit and the first axle element are formed integrally or as one piece by means of a casting process, wherein the first axle element together with the housing of the converter unit can be welded to a second axle element, such as the axle tube so that a very compact design can be achieved. Alternatively preferably, the first axle element may be fixed to the housing of the converter unit by means of a friction welding process, wherein the housing of the converter unit is formed as one piece with or an integral part of the second axle element.

Preferably, at least a portion of the transmission element is guided in a casing, wherein the casing supports the actuation unit against the converter unit. The casing of the transmission element preferably is tube- or sleeve-shaped, and takes over the function of securing the transmission element and the remaining brake system against the ingress of dirt or foreign matter on the one hand and, on the other hand, its function is to transmit forces. Thus, during the braking operation, when the transmission element is pushed or displaced into the converter unit by the actuation unit, the casing prevents that the actuation unit moves away from the converter unit. In order to transmit forces, the casing preferably at its two ends running along the transmission direction has respective flanges, by means of which the casing is frictionally or force-fittingly connected or positively or form-fittingly connected both to the actuation unit and the converter unit. Alternatively, it may be preferred to fix the casing to the actuation unit and/or to the converter unit by means of a welded joint.

In a preferred embodiment, the housing of the converter unit is formed as an integral part of the casing and/or the guiding unit. In order to save weight, for example by avoiding additional fastening elements such as screws/bolts or pins, and in order to reduce the assembly work for the brake system, it is preferred to design as many components as is possible single-piece. Furthermore, it is advantageous to form the housing of the converter unit and/or the guiding unit as load-bearing components of the axle of the utility vehicle. For example, the housing of the converter unit may form an integral part of the casing and/or of the guiding unit, wherein the respective components preferably may be manufactured in a single casting step. This is in particular preferred since a single-piece casting also makes it possible to easily, advantageously and inexpensively realize a transmission of forces between the individual elements. For example, in case the guiding legs of the guiding unit form an integral part of the housing of the converter unit, forces may particularly advantageously be transmitted from the brake element via the guiding legs to the housing of the converter unit, if particularly preferably the converter unit forms an integral part of the first and/or of the second axle element, for example. Furthermore, the casing of the transmission element may form an integral part of the housing of the converter unit, wherein in order to mount the brake system, only the actuation unit needs to be fixed to the casing by means of a frictional connection via a screw/bolt, for example.

Preferably, the transmission element at the distal end thereof facing away from the actuation unit has a cross-sectional thickness, which increases towards the actuation unit, wherein the piston element with the side thereof facing the wheel axis indirectly or directly rests on the transmission element. To put it differently, the distal end of the transmission element can be defined as a spreading wedge, particularly preferably for use in a wedge drum brake. As cross-sectional thickness of the transmission element there is preferably defined the extension of the transmission element transverse to the transmission axis. The transmission element, at the distal end thereof opposite the actuation unit, has a cross-sectional thickness, which increases towards the actuation unit, such as a wedge-shaped or cone-shaped section. Depending on the degree of increase of the cross-sectional thickness or depending on the inclination of the cone- or wedge-shaped geometry, a certain displacement of the transmission element along the transmission axis will lead to a certain displacement of the piston elements transverse to the wheel axis. The steeper the inclination of the wedge-shaped geometry of the transmission element, the greater the force, which has to act on the transmission element in order to achieve a certain braking effect due to the displacement of the piston elements and shoe elements against the brake drum. In case the inclination of the wedge-shaped geometry is kept less steep, the transmission element has to follow a longer path in order to achieve the same degree of displacement of the piston element transverse to the wheel axis as it would have been achieved in the case of a steeper inclination and a shorter path length of the displacement of the transmission element along the transmission axis. Here, the piston element may directly rest against the transmission element, i.e. immediately or surface on surface, or it may indirectly rest against the transmission element, i.e. via roll, ball or roller bodies or a slide-enhancing intermediate body, for example. The disadvantage of a direct contact between the surface of the piston element facing the wheel axis and the transmission element is that, due to the friction occurring during the displacement operation of the transmission element, energy will be lost, which would otherwise be available for generating a braking force. Therefore, it is particularly preferred to provide the piston element at the side thereof facing the wheel axis with rolls, balls or rollers, which are supported rotatably on the piston element and which may roll along the preferably wedge-shaped surface of the transmission element with relatively little resistance to rolling. Thus, it is in particular possible to do without lubricants such as grease or oil, which in turn can be a danger for the brake system since they may ignite due to the high temperatures present.

Preferably, the direction of the force transmission from the transmission element to the piston element, or the axis or line of displacement of the piston element runs through the intersection of the wheel axis and the transmission axis. Advantageously, the danger of jamming or canting of the piston element in the converter unit can be reduced in that the piston element moves along an axis, which intersects the intersection of the wheel and transmission axes, wherein simultaneously also the force transmission to the piston element runs along said axis. Here, the force transmission or the actual force transmission from the transmission element to the piston element can indeed take place at different points, wherein, however, said points are arranged symmetrically about the direction of the force transmission or about an axis, which intersects the intersection of the wheel axis and the transmission axis and particularly preferably is perpendicular to the wheel axis.

In a further preferred embodiment, there is provided a second axle element, which is fixable to the first axle element and/or the housing of the converter unit so as to support the brake system on the vehicle frame of the utility vehicle. Particularly preferably, the second axle element can be an axle tube of a rigid axle of the utility vehicle, wherein at the respective outer ends of the axle tube the housing of the converter unit is fixed to the second axle element or to the axle tube. Furthermore, either on the housing of the converter unit or on the second axle element, the first axle element can be fixed by means of a welded joint, wherein particularly preferably in the area of the housing of the converter unit there are provided material reinforcements in order to increase the bending strength both of the first and of the second axle elements. An essential function of the second axle element is to support the brake system and further chassis components such as the wheel or peripheral brake systems on the vehicle frame of the utility vehicle, wherein particularly preferably also a suspension system engages the second axle element so as to spring-mount the axle elements and the brake system on the vehicle frame. Particularly preferably, the second axle element is made from a weldable material such as steel, wherein both the housing of the converter unit and the first axle element preferably can be fixed to the second axle element by means of a friction welding process or a thermal welding process.

In an alternatively preferred embodiment, there is provided a second axle element, which can be fixed to a guiding unit in order to support the brake system on the vehicle frame of the utility vehicle. In this preferred embodiment, there are provided fastening means such as cavities or projections with an external thread on the guiding unit, in particular on both guiding legs of the guiding unit, which fastening means serve for accommodating a respective flange of the second axle element. Advantageously, it is thus possible to arrange the actuation unit at an angle α=0° relative to the wheel axis, wherein in particular the building space required for the brake system or the wedge drum brake can be reduced. Further preferably, the second axle element can be fixed to the guiding unit or other fastening units of the brake system by means of a plurality of fastening points, i.e. three or four fastening points, for example, which are arranged axis-symmetric to the wheel axis. Thus, it is possible to transmit a larger bending moment from the brake system or from the first axle element, which is preferably fixed to the brake system, to the second axle element. Preferably, the first axle element and the housing of the converter unit form one piece with the guiding unit and are fixed to the second axle element together with the guiding unit.

Particularly preferably, by integrating the converter unit, the casing of the transmission element and the guiding unit into the first and/or second axle element, it is possible to save the brake carrier, which, in the brake systems known in the prior art, accommodates the actuation unit on the chassis system. Hence, the brake system is more compact and more light-weight than previous brake systems.

BRIEF DESCRIPTION OF THE FIGURES

Further advantages and features of the present invention become apparent from the following description with reference to the appended Figures. Individual features of the various embodiments shown may be combined within the framework of the invention. The Figures show.

DETAILED DESCRIPTION OF THE PREFERRED EMBODIMENTS

Figure 1:
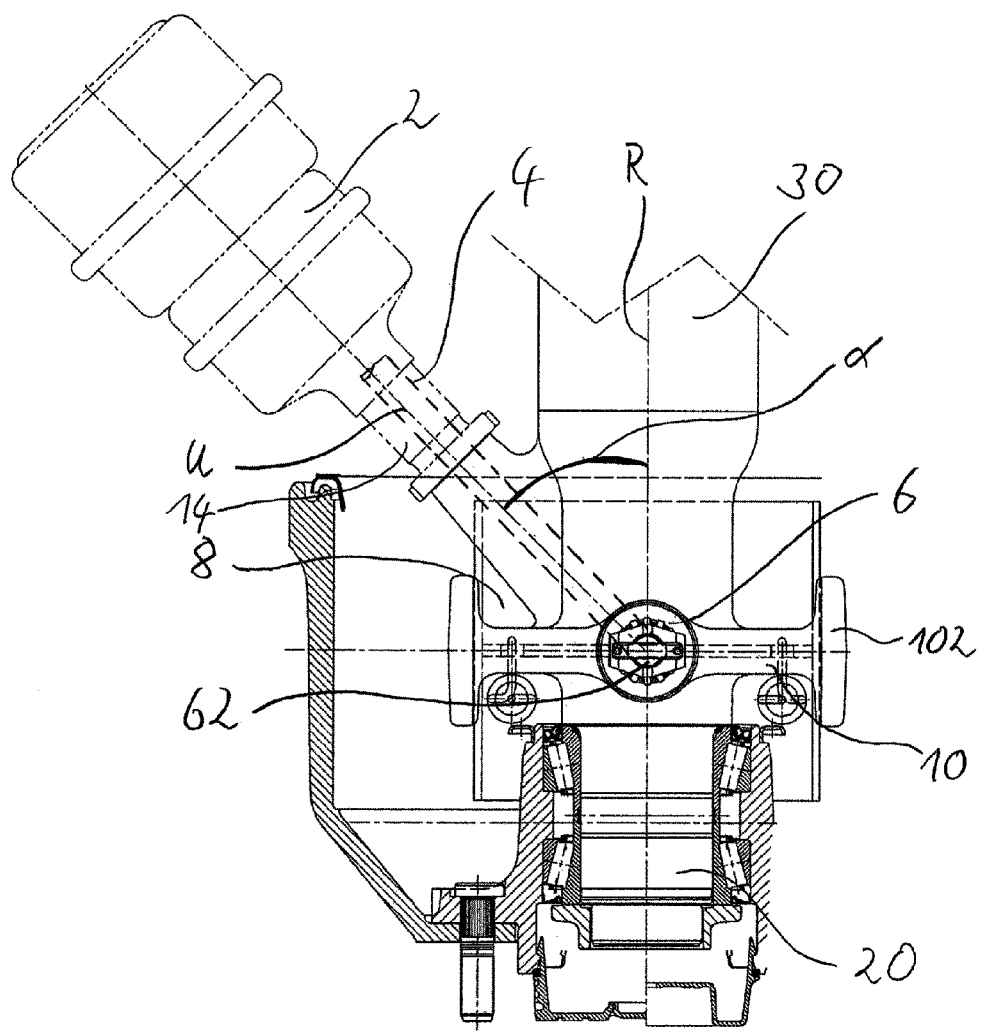
FIG. 1 shows a schematic representation of a preferred embodiment of the brake system according to the invention.

FIG. 1 shows the essential components of the brake system according to the invention, which preferably is construed as a wedge drum brake. There is provided an actuation unit 2, which displaces a rod-shaped or longish transmission element 4 (shown in dashed lines) along a transmission axis U, wherein the transmission element 4 projects into a converter unit 6 in order to come into engagement with at least one, preferably two piston elements 62 there. The actuation unit 2 can for example be a pneumatically actuated membrane cylinder. The converter unit 6 preferably is arranged on a wheel axis R, wherein particularly preferably the direction of movement of the piston element 62 intersects the wheel axis R in that point, in which also the transmission axis U intersects the wheel axis R. Thus, the engagement point of the transmission element 4 on the piston element 62 is aligned exactly centeredly to the direction of movement of the piston element 62. Furthermore, a guiding unit 10 comprising two guiding legs 102 is arranged preferably adjacent to or within the converter unit 6. The guiding unit 10 particularly preferably serves for guiding the non-shown shoe elements. Preferably, a first axle element 20 comprising a portion, which is formed rotation-symmetric about the wheel axis R for rotatably supporting a wheel of the utility vehicle, forms an integral part of the housing of the converter unit 6. The actuation unit 2 rest on the converter unit 6 via a casing 14, wherein the casing 14 preferably prevents that dirt enters both the actuation unit 2 and the converter unit 6. Since during the braking operation the transmission element 4 is pushed away by the actuation unit 2 and pushed into the converter unit 6, the casing 14 is preferably subjected to a tensile load and has to be dimensioned or construed accordingly. As is shown in FIG. 1, it is preferred that the casing 14, the housing of the converter unit 6 and the first axle element 20 and also the guiding unit 10, respectively, are formed integrally or one-piece. A dashed line shows the second axle element 30, wherein it has a curved geometry in the preferred embodiment in order to provide more building space for the actuation unit 2 and in order to be able to keep the angle α between the wheel axis R and the transmission axis U small. Particularly preferably, the compound of the first axle element 20, the converter unit 6, the guiding unit 10 and the casing 14 of the transmission unit is fixed to the second axle element 30 by means of a substance-to-substance bond. Preferably, the guiding unit 10 comprises at least two, particularly preferably four guiding legs 102, wherein two respective opposite surfaces of the guiding legs 102 hold a respective shoe element 8 on a path, which is preferably perpendicular to the wheel axis R. By means of preferably two piston elements 62, wherein only the upper one from the point of view of the viewer is shown, the shoe elements 8 are pushed against a brake drum surrounding the brake system, wherein there is friction between the shoe elements 8 and the inner surface of the brake drum. At the first axle element 20, there is schematically indicated a wheel bearing, in particular a roller bearing, in order to rotatably mount a wheel of the utility vehicle about the wheel axis R.

Figure 2:
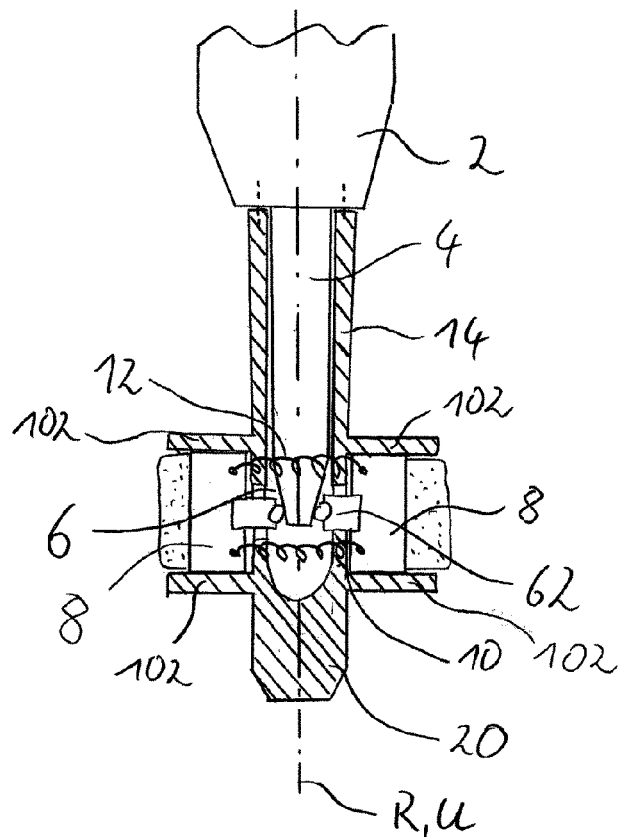
FIG. 2 shows a further schematic view of a preferred embodiment of the brake system according to the invention.

FIG. 2 shows a further preferred embodiment of the brake system according to the invention. From the perspective of view shown, the wheel axis R is seemingly collinear to the transmission axis U. Furthermore, there is shown the preferably wedge-shaped geometry at the bottom tip of the transmission element 4, which tip is in contact with two roller elements or roll bodies attached to the piston elements 62 and, when the transmission element 4 is displaced along the transmission axis U, enlarges the distance between the two piston elements 62. At each piston element 62, there is fixed one shoe element 8, which is also displaced when the piston element 62 is displaced. During this displacement movement, the shoe elements 8 are held on a path lying transverse to the wheel axis R by the guiding legs 102. Furthermore, there is provided a resetting element 12, which is in engagement with the shoe elements 8 in order to hold the latter pushed or pressed or urged against the piston elements 62.

Figure 3:
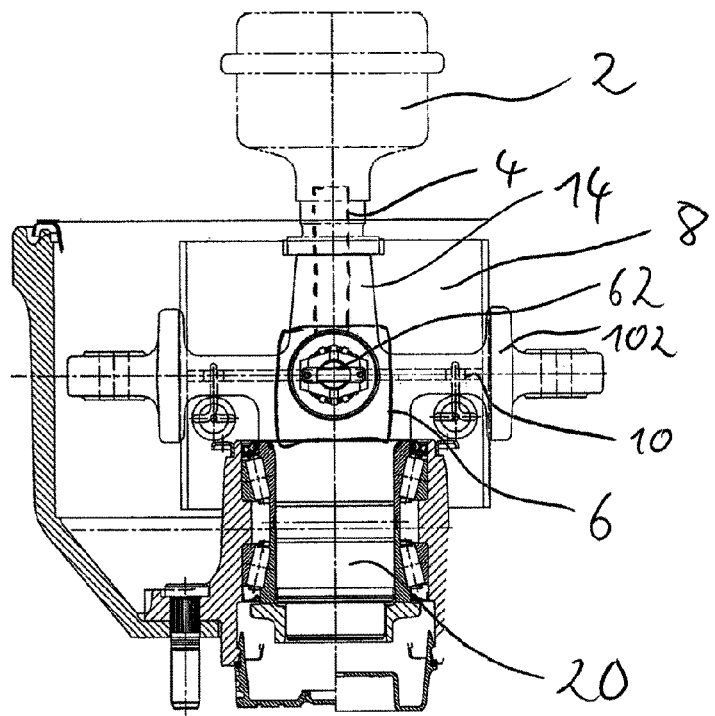
FIG. 3 shows a sectional view of a preferred embodiment of the brake system according to the invention.

FIG. 3 shows a sectional view of a preferred embodiment of the brake system according to the invention. There is clearly shown that at each guiding leg 102 of the guiding unit 10 there is provided a projection-like material web, at which particularly preferably a second axle element may be fixed. In this preferred embodiment, the actuation unit 2 may be arranged coaxially to the wheel axis R, wherein respective fastening portions of the second axle element 30 surround the actuation unit. Opposite the actuation unit 2, the first axle element 20 is fixed to the converter unit 6, which in turn forms an integral part of the guiding unit 10. In FIG. 3, only the bottom shoe element 8 from the point of view of the viewer is shown, wherein the upper shoe element 8 is not shown for the sake of clarity. A dashed line indicates the transmission element 4, which is located in the casing 14 between the actuation unit 2 and the converter unit 6 and transmits a force from the actuation unit 2 to the converter unit 6. At the left-hand side, there is indicated the brake drum of the brake system, which may be fixed to the rotating part of the chassis, such as the hub of the wheel, and which during the braking operation rubs against a preferably provided friction lining of the shoe element 8.

REFERENCE SIGNS

2—actuation unit
4—transmission element
6—converter unit
8—shoe element
10—guiding unit
12—resetting element
14—casing
20—first axle element
30—second axle element
62'piston element
102—guiding leg
R—wheel axis
U—transmission axis
α—angle

The invention claimed is:

1. A brake system for utility vehicles, comprising:
an actuation unit;
a transmission element; and
a converter unit;
wherein the actuation unit moves the transmission element along a transmission axis;
wherein the converter unit is arranged on a wheel axis of rotation and comprises at least one piston element;
wherein the converter unit includes a housing that is integral with a first axle element;
wherein the transmission axis intersects the wheel axis of rotation at least in the region of the converter unit;
wherein the transmission element is adapted to transmit a force onto the piston element to move the piston element transverse to the wheel axis of rotation;
wherein at least a portion of the transmission element is guided in a casing;
wherein the casing supports the actuation unit against the converter unit; and
wherein the housing of the converter unit is integral with the casing.

2. The brake system of claim 1, further comprising:
a shoe element that is movable transverse to the wheel of rotation, wherein the shoe element includes a brake lining at a side of the shoe element opposite the wheel axis.

3. The brake system of claim 2,
wherein the piston element is adapted to exert a force onto the shoe element to displace the shoe element transverse to the wheel axis of rotation and to bring the shoe element into a position in which the shoe element brakes.

4. The brake system claim 3, further comprising:
a guiding unit that holds the shoe element on a path lying transverse to the wheel axis of rotation.

5. The brake system of claim 4, wherein the guiding unit includes two parallel guiding legs each having a facing surface, and wherein the shoe element is guided between the facing surfaces of the guiding legs.

6. The brake system of claim 5, wherein the facing surfaces of the guiding legs of the guiding unit are directed perpendicular to a plane spanned by the wheel axis of rotation and the transmission axis.

7. The brake system of claim 6, wherein the wheel axis of rotation is displaced relative to the transmission axis by an angle α within a range of about 0° to about 85°.

8. The brake system of claim 7, wherein the converter unit is comprised of at least one cavity in the first axle element.

9. The brake system of claim 8, wherein the housing of the converter unit comprises an integral part of the guiding unit.

10. The brake system of claim 9, wherein a distal end of the transmission element facing away from the actuation unit includes a cross-sectional thickness that increases towards the actuation unit, and wherein a side of the piston element facing the wheel axis of rotation one of indirectly and directly rests on the transmission unit.

11. The brake system of claim 10, wherein a direction of the force transmission from the transmission element to the piston element runs through the intersection of the wheel axis of rotation and the transmission axis.

12. The brake system of claim 11, further comprising:
a second axle element adapted to be fixed to the guiding unit to support the brake system on a vehicle frame of a utility vehicle.

13. The brake system of claim 12, further comprising:
a resetting element that holds the shoe element against at least one of the piston element and an opposite shoe element.

14. The brake systems of claim 11, further comprising:
a second axle element adapted to be fixed to at least one of the first axle element and the housing of the converter unit to support the brake system on a vehicle frame of a utility vehicle.

15. The brake system of claim 7, wherein the angle α is within the range of between 0° and 75°.

16. The brake system of claim 15, wherein the angle α is 45°.

17. The brake system of claim 2, further comprising:
a resetting element that holds the shoe element against at least one of the piston element and an opposite shoe element.

18. The brake system of claim 2, further comprising:
a guiding unit that holds the shoe element on a path lying transverse to the wheel axis of rotation.

19. The brake system of claim 1, wherein the wheel axis is displaced relative to the transmission axis by an angle α within a range of about 0° to about 85°.

20. The brake system of claim 19, wherein the angle α is within the range of between 0° and 75°.

21. The brake system of claim 20, wherein the angle α is 45°.

22. The brake system of claim 1, further comprising:
a second axle element adapted to be fixed to the guiding unit to support the brake system on a vehicle frame of a utility vehicle.

23. The brake system of claim 22, further comprising:
a resetting element that holds the shoe element against at least one of the piston element and an opposite shoe element.

24. The brake system of claim 1, wherein the converter unit is comprised of at least one cavity in the first axle element.

25. The brake system of claim 1, wherein the housing of the converter unit comprises an integral part of the guiding unit.

26. The brake system of claim 1, wherein a distal end of the transmission element facing away from the actuation unit includes a cross-sectional thickness that increases towards the actuation unit, and wherein a side of the piston element facing the wheel axis of rotation one of indirectly and directly rests on the transmission unit.

27. The brake system of claim 1, wherein a direction of the force transmission from the transmission element to the piston element runs through the intersection of the wheel axis of rotation and the transmission axis.

28. The brake systems of claim 1, further comprising:
a second axle element adapted to be fixed to at least one of the first axle element and the housing of the converter unit to support the brake system on a vehicle frame of a utility vehicle.

* * * * *